Dec. 30, 1969     J. J. GEIST     3,486,977
NEUTRONIC REACTOR WITH NATURAL CIRCULATION OF FLUID FUEL
Filed March 12, 1968
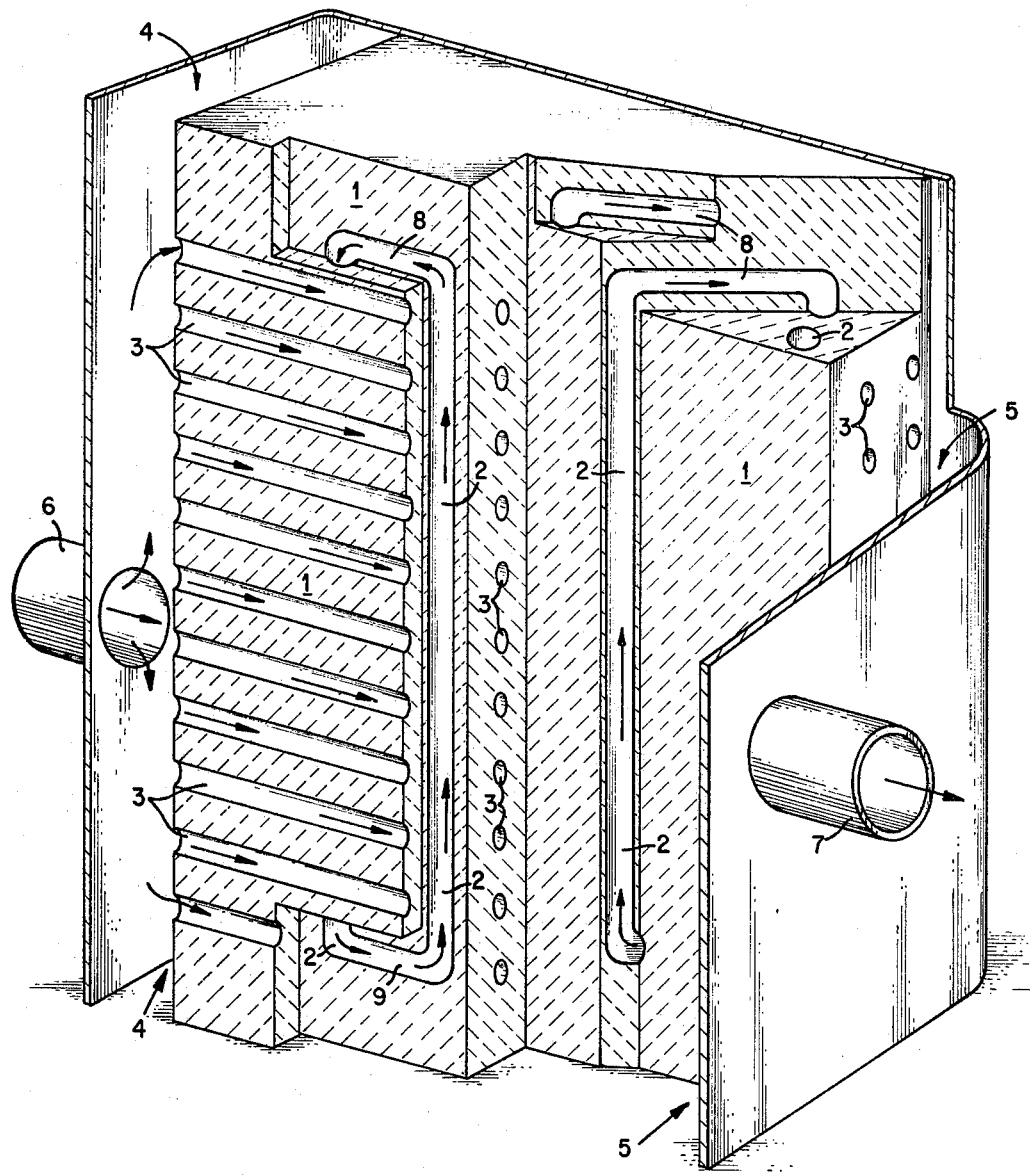
INVENTOR.
J. Jacques Geist
BY
ATTORNEY.

United States Patent Office 3,486,977
Patented Dec. 30, 1969

3,486,977
NEUTRONIC REACTOR WITH NATURAL
CIRCULATION OF FLUID FUEL
Jean Jacques Geist, Schagen, North Holland, Netherlands, assignor, by mesne assignments, to the United States of America as represented by the United States Atomic Energy Commission
Filed Mar. 12, 1968, Ser. No. 712,565
Int. Cl. G21c 15/20, 15/02, 19/28
U.S. Cl. 176—51       4 Claims

ABSTRACT OF THE DISCLOSURE

A neutronic reactor wherein fluid fuel is disposed in vertically extending fuel channels which pass through the reactor active core region. Each vertically extending fuel channel communicates in a closed loop within the core region with at least one other vertically extending fuel channel having a different heat source load factor so as to facilitate natural circulation of the fluid fuel through the closed loop. A multiplicity of coolant channels pass through the active core region of the reactor orthogonal to but not intersecting the vertically extending fuel channels.

BACKGROUND OF THE INVENTION

The invention described herein relates generally to neutronic reactors, and more particularly to a fluid-fueled neutronic reactor characterized by natural circulation of its fluid fuel. It was made in the course of, or under, a contract with the U.S. Atomic Energy Commission.

In known fluid-fueled neutronic reactors the heat generated through the fission process within the active core region of the reactor is generally removed from the active core region by physically removing the fluid fuel to a point outside the active core region where it is passed through a heat exchanger. Such an arrangement requires an excessively large fuel inventory, however, because of the substantial quantity of fuel which is always outside of the active core region in the associated pumps, piping and heat exchangers. In breeder reactors, where fertile material such as thorium is converted into fissile material, large fuel inventories necessarily result in long doubling times; i.e., the time necessary to produce a surplus of fissile material equal to the initial inventory in the reactor.

Neutronic reactors utlizing fluid fuels which are essentially static do not require such large fuel inventories as do reactors where the fluid fuel is circulated through external heat exchangers. In static fluid fuel reactors the heat generated in the fuel is removed by a separate coolant which is passed through the active core region of the reactor.

The use of static fluid fuel, although permitting a highly beneficial reduction in fuel inventory, gives rise to some disadvantages including a smaller degree of fuel burnup than in circulating fuel schemes. If the fuel enrichment is uniform throughout the core, large variations in power density occur and portions of the core must be operated at less than maximum power density so that permissible temperature levels are not exceeded in core regions operating at maximum power density. The use of static fluid fuel also reduces fuel utilization at the axial ends of the core where the neutron flux is lowest.

A major advantage which fluid fuels have over solid fuels is their amenability to continuous processing for the removal of fission products. Such processing permits extraordinarily high fuel burnups and increases the breeding gain of the system. Where the fluid fuel is maintained in a static configuration, however, continuous removal of the fuel from the system for passage through a processing loop is complicated. Circulating fluid fuel, on the other hand, may be continuously withdrawn, processed, and returned to the reactor core by tapping into the circulating fuel loop at a single point.

It is, therefore, a general object of this invention to provide a fluid-fueled neutronic reactor having the advantages of a circulating fluid fuel system while operating with a reduced fuel inventory comparable to that associated with a static fluid fuel system.

SUMMARY OF THE INVENTION

In accordance with the invention, a fluid-fueled neutronic reactor is provided in which fluid fuel is disposed in vertically extending fuel channels which pass through the active core region of the reactor. Each vertically extending fuel channel communicates in a closed loop within the core with one other vertically extending fuel channel having a different heat source load factor so as to facilitate natural circulation of the fluid fuel through the closed loop. Such natural circulation of the fluid fuel within the reactor core provides the high fuel burnup and amenability to continuous processing characteristic of circulating fuel systems, while permitting operation with a small fuel inventory as is characteristic of static fuel systems.

DESCRIPTION OF THE PREFERRED EMBODIMENT

An isometric view, partly cut away, of a fluid-fueled neutronic reactor designed in accordance with the invention is illustrated in the drawing. The reactor shown operates in the thermal neutron spectrum, with a matrix of graphite blocks 1 serving as moderator. As shown, fuel channels 2 and coolant channels 3 are machined directly into graphite blocks 1. Nuclear grade graphite is impermeable, and possesses high directional heat conductivity which is used optimally to increase heat flow in the lateral direction between fuel channels 2 and coolant channels 3.

In the alternative case of a fast breeder reactor, the graphite blocks 1 could be replaced by a metal structure which separates the fuel and coolant channels while presenting a suitable heat transfer medium and the lowest possible absorption cross section for fast neutrons.

Both fluid metals and molten salts are possible coolant candidates for the reactor. Ideally, the coolant disposed in channels 3 should have a chemical composition similar to that of the fluid fuel disposed in channels 2 so as to minimize the possible deleterious effects of any leakage between the fuel and coolant channels. This is especially true where the coolant contains fertile material and is continually processed for the removal of fissionable material.

Referring back to the drawing, coolant channels 3 are shown terminating in inlet and outlet coolant plenums 4 and 5 respectively. An inlet pipe 6 discharges low temperature coolant into inlet plenum 4. The coolant flows from inlet plenum 4 through channels 3 where it is heated, and then discharges into outlet plenum 5. The heated coolant flows from outlet plenum 5 through outlet pipe 7 to a coolant loop (not shown) of conventional design. Molten salt coolant containing fertile material may be pumped through coolant channels 3 at a flow velocity of about 3 m./sec. and a minimum temperature of about 500° C.

Pairs of or clusters of vertically oriented fuel channels 2 are joined at their upper and lower ends by connecting channels 8 and 9, respectively, to form closed loops. The pairs or clusters of channels are selected so that only channels having dissimilar heat source load factors are joined to form closed loops. The term "heat source load factor" as used herein relates to the heat generation rate within each channel. Ordinarily, channels near the center of the reactor core have higher heat source load factors than those located near the core periphery. Channels having higher heat source load factors are also characterized by higher temperatures unless a heat removal system of special design is used to achieve a uniform temperature distribution. Applicant takes advantage of this naturally occurring nonuniform temperature distribution to provide natural convection circulation of the fluid fuel within the closed loops formed by fuel channels 2, and upper and lower connecting channels 8 and 9. Such natural circulation results in a reactor system characterized by high fuel utilization, amenability to continuous fuel processing, and a uniform power density while operating with the reduced fuel inventory characteristic of static fueled reactors.

The above description of the invention was offered for illustrative purposes only, and should not be interpreted in a limiting sense. For example, other fuel and coolant channel cross sections, spacings and orientations may be used in place of those shown in the drawing. Tubular metal liners or cross-over pipes may be used in the alternative to form the closed fuel loops which are provided in the illustrated reactor embodiment by channels machined into the graphite blocks. Natural fuel circulation according to the present invention may also be provided in fast reactor systems or those employing moderator materials other than graphite.

I claim:
1. In a neutronic reactor wherein fluid fuel is disposed in a multiplicity of vertically oriented fuel channels, the improved system for effecting circulation of said fuel within said fuel channels wherein each of said fuel channels is connected through channels at its upper and lower ends to the respective upper and lower ends of at least one other fuel channel having a different heat source load factor so as to form closed loops, said closed loops positioned wholly within the active region of the core and wherein naturally circulation of said fluid fuel occurs within said closed loops.

2. The improved system of claim 1 wherein coolant channels are disposed orthogonal to but not intersecting said fuel channels.

3. The improved system of claim 1 wherein the active core region of said neutronic reactor comprises a multiplicity of stacked graphite blocks, and wherein said fuel channels comprise passageways machined into said graphite blocks.

4. The improved system of claim 3 wherein coolant channels are disposed within said graphite blocks orthogonal to but not intersecting said fuel channels, and wherein the grain structure of said graphite blocks is oriented to provide maximum heat conductivity between said fuel and coolant channels.

References Cited

UNITED STATES PATENTS

| | | | |
|---|---|---|---|
| 2,990,354 | 6/1961 | Anderson et al. | 176—46 |
| 3,039,948 | 6/1962 | Krucoff | 176—45 |
| 3,050,454 | 8/1962 | Barr et al. | 176—46 |
| 3,262,856 | 7/1966 | Bettis | 176—49 |
| 3,284,309 | 11/1966 | Murphree | 176—45 |

FOREIGN PATENTS

| | | |
|---|---|---|
| 835,266 | 5/1960 | Great Britain. |
| 897,889 | 5/1962 | Great Britain. |
| 631,890 | 11/1961 | Canada. |

CARL D. QUARFORTH, Primary Examiner

H. E. BEHREND, Assistant Examiner

U.S. Cl. X.R.
176—47, 49